(12) United States Patent
Furuya

(10) Patent No.: US 7,537,254 B2
(45) Date of Patent: May 26, 2009

(54) ATTACHMENT STRUCTURE OF OBJECT DETECTOR

(75) Inventor: Yoshihito Furuya, Nasukarasuyama (JP)

(73) Assignee: Honda Motor Co., Ltd., Tokyo (JP)

( * ) Notice: Subject to any disclaimer, the term of this patent is extended or adjusted under 35 U.S.C. 154(b) by 257 days.

(21) Appl. No.: 11/522,070

(22) Filed: Sep. 15, 2006

(65) Prior Publication Data

US 2007/0063133 A1    Mar. 22, 2007

(30) Foreign Application Priority Data

Sep. 20, 2005  (JP) ............................. 2005-271743

(51) Int. Cl.
*B60R 19/02* (2006.01)
(52) U.S. Cl. ..................................... 293/117
(58) Field of Classification Search ............... 293/117, 293/119, 132
See application file for complete search history.

(56) References Cited

U.S. PATENT DOCUMENTS 2,959,251 A * 11/1960 Landman et al. ............ 180/276
6,142,542 A * 11/2000 Sherno ........................ 293/132
7,086,674 B2 * 8/2006 Goertz ........................ 293/132

FOREIGN PATENT DOCUMENTS

| JP | S50-26237 | 3/1975 |
|----|-----------|--------|
| JP | 06-161544 | 6/1994 |
| JP | 10-123248 | 5/1998 |
| JP | 2001-030871 | 2/2001 |
| JP | 2002-357653 | 12/2002 |
| JP | 2003-034198 | 2/2003 |
| JP | 2004-345425 | 12/2004 |
| JP | 2005-145393 | 6/2005 |

* cited by examiner

*Primary Examiner*—Dennis H Pedder
(74) *Attorney, Agent, or Firm*—Carrier, Blackman & Associates, P.C.; Joseph P. Carrier; William D. Blackman

(57) ABSTRACT

An attachment structure of an object detector to a vehicle body which includes: a support portion provided on the object detector; a fixing portion which fixes the object detector to the vehicle body at the support portion; an exterior member provided in front of the object detector; and a guide member which abuts the exterior member and controls a moving direction of the exterior member when the exterior member moves toward the object detector due to a collision of the vehicle body.

10 Claims, 6 Drawing Sheets

US 7,537,254 B2

ATTACHMENT STRUCTURE OF OBJECT DETECTOR

BACKGROUND OF THE INVENTION

1. Field of the Invention

The present invention relates to an attachment structure of an object detector such as radar to a vehicle body, the detector which detects an object ahead of a vehicle and its relative distance.

Priority is claimed on Japanese Patent Application No. 2005-271743, filed Sep. 20, 2005, the content of which is incorporated herein by reference.

2. Description of the Related Art

In a vehicle body, various kinds of impact absorbing structures exist in preparation for a collision or the like. For example, a disposing structure for a device with a high rigidity is known in which an easily-deformable member is disposed adjacent to the device. The structure allows the frame of the vehicle body to be smoothly collapsed at a time of a collision by moving the device out of the collapsing track of the frame by the easily-deformable member being bent during the collision (see, for example, Japanese Unexamined Patent Application, First Publication No. 2003-34198).

In addition, an attachment structure of an object detector such as radar to a vehicle body is known in which the object detector is fixed to a bracket of the vehicle body via a nut made of resin. This attachment structure is adapted to reduce the damage of the object detector due to a collision by allowing the detector to move rearward by the resin nut dropping off the bracket (see, for example, Japanese Unexamined Patent Application, First Publication No. 2002-357653).

The aforementioned structures prevent a great force from being applied to the devices by moving the devices or allowing the devices to move when the frame or an exterior member of the vehicle body moves rearward during a collision. Therefore, there may be a case in which the misalignment of the axis of the detector due to a minor collision cannot be prevented when applying the structures to an object detector.

That is, since the structures of the related art are only adapted to make the devices move more easily when a collision force is applied, there is a possibility that the axis of the object detector is misaligned by being pushed by an exterior member of the vehicle such as a bumper or a grill when the members move rearward due to a minor collision.

In such a minor collision in which the bumper or the grill slightly deforms, the object detector can usually be used afterward if the axis of the detector is not misaligned. However, if the axis is misaligned, the detector becomes unusable afterward.

SUMMARY OF THE INVENTION

An object of the present invention is to provide an attachment structure of an object detector, the structure enabling the use of the detector after a minor collision by preventing the misalignment of the axis of the detector.

A first aspect of the present invention is an attachment structure of an object detector to a vehicle body comprising: a support portion provided on the object detector; a fixing portion which fixes the object detector to the vehicle body at the support portion; an exterior member provided in front of the object detector; and a guide member which abuts the exterior member and controls a moving direction of the exterior member when the exterior member moves toward the object detector due to a collision of the vehicle body.

In the attachment structure of the present invention, when the exterior member moves toward the object detector by receiving a collision force during a collision, the exterior member is moving-direction controlled by abutting the guide member.

The guide member may have a guide surface for abutting the exterior member and guiding the movement of the exterior member. In this case, the moving direction of the exterior member changes along the guide surface of the guide member.

The attachment structure of the present invention may further include a support member provided in the vehicle body, wherein the fixing portion fixes the support member to the support portion; the guide member has a first member which extends ahead of the vehicle body, and a second member connected at a front end of the first member, extending rearward of the vehicle body at an angle, and constituting the guide surface; and the first member and the second member are fixed to the support member.

In this case, the second member is supported by the support member together with the first member in a truss manner, in the state of descending rearward. Since the support member is a member which allows the vehicle body to support the object detector and has a high rigidity, the second member constituting the guide surface is supported to the vehicle body with a high rigidity, in conjunction with the aforementioned truss structure.

The guide member may control the exterior member so as to move apart from the object detector.

The exterior member may be at least one of a bumper and a grill on the vehicle body.

DETAILED DESCRIPTION OF THE INVENTION

An embodiment of the present invention shall be described with reference to the drawings.

Figure 1:
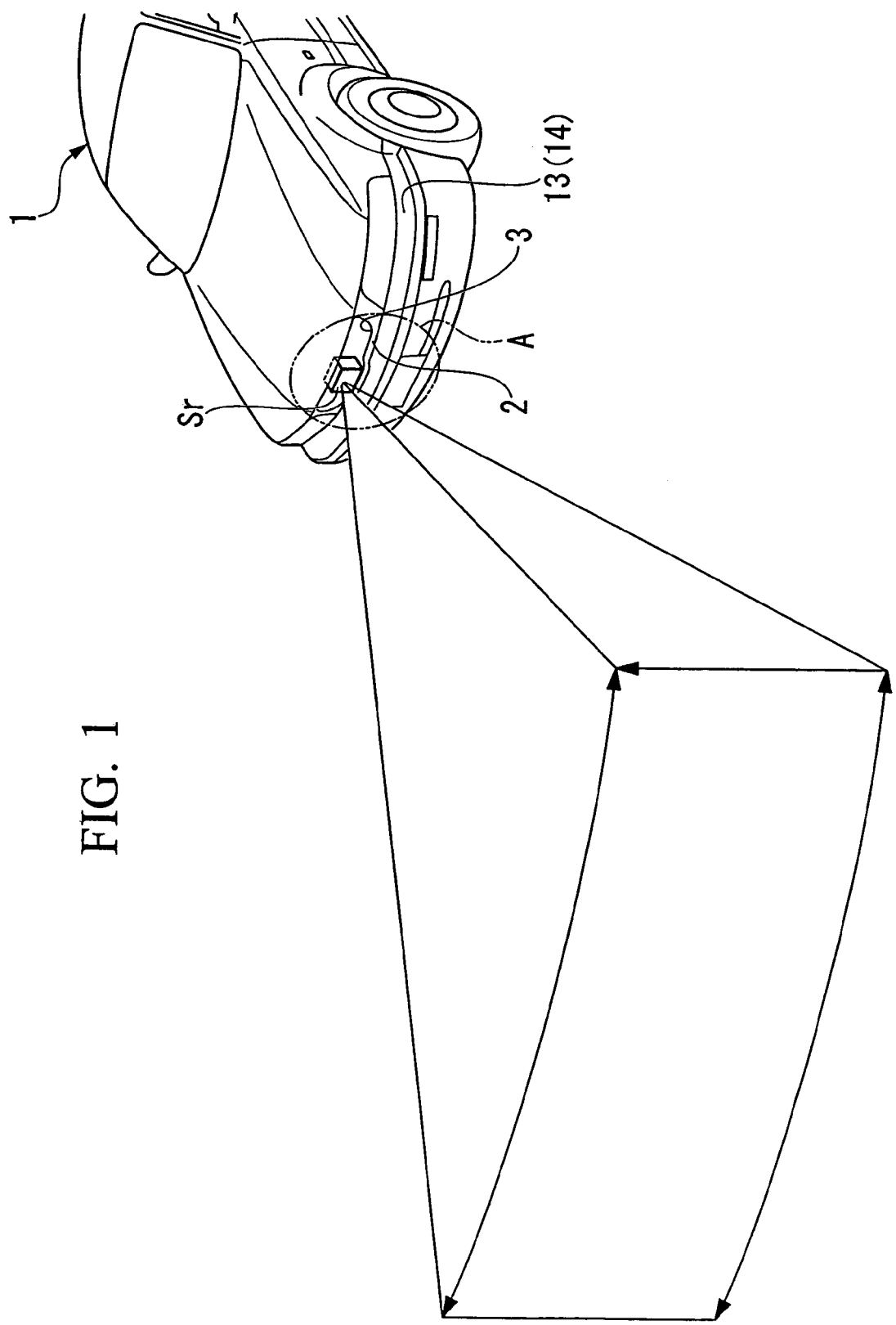
FIG. 1 is a perspective view of a vehicle to which an attachment structure of an embodiment of the present invention is applied.

FIG. 1 is a perspective view of a vehicle 1 to which an attachment structure of the present embodiment is applied. A front grill 2 having a base opening 3 is provided in the front of the vehicle 1 and a millimeter-wave radar device Sr is disposed on the back of the base opening 3.

Figure 2:
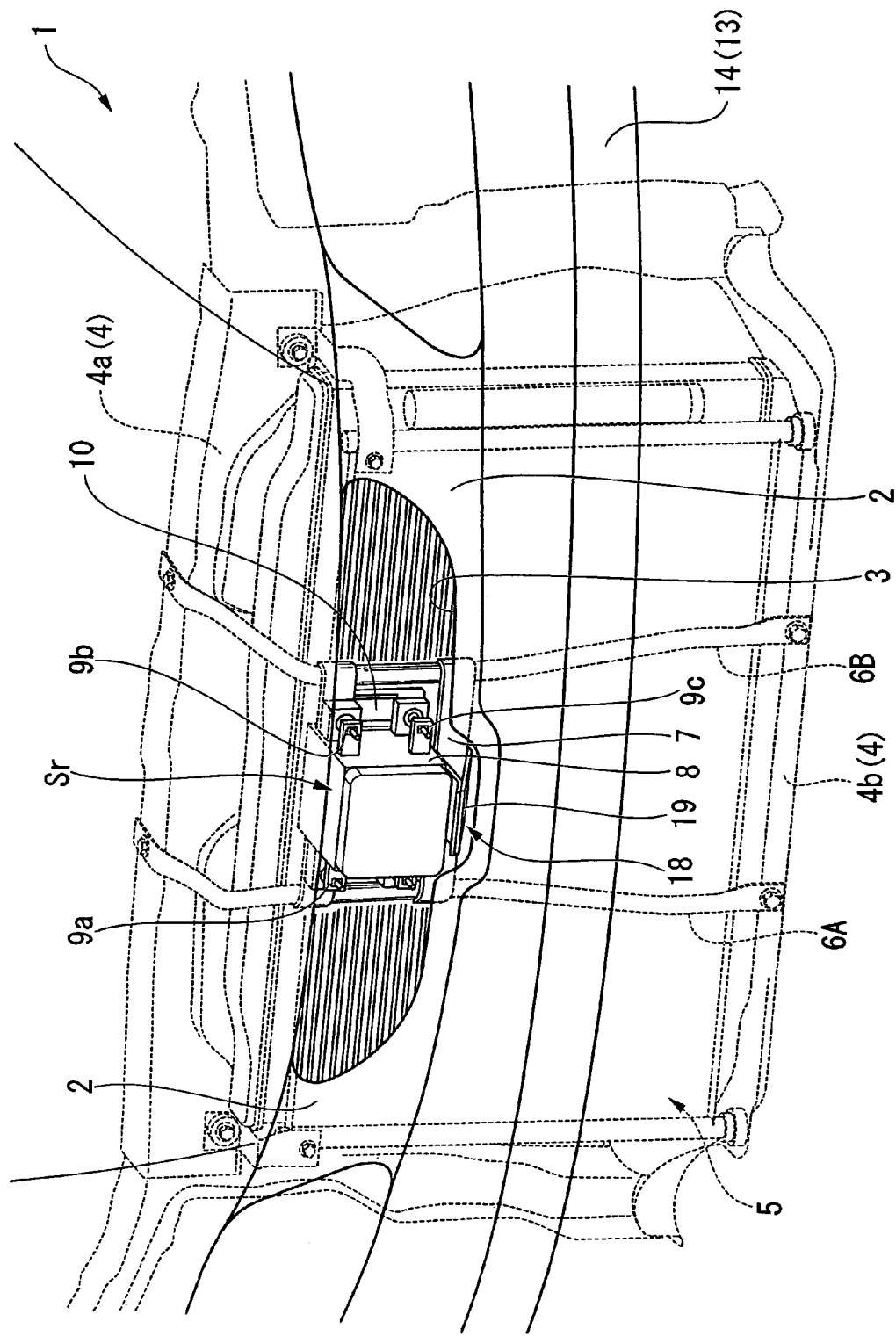
FIG. 2 is an enlarged perspective view of the portion A shown in FIG. 1.

As shown in FIG. 2, a bulkhead 4 is coupled on the front end of the left and right side frames (not illustrated) of a vehicle body of the vehicle 1. A radiator 5 is attached to the bulkhead 4 and a pair of pipe brackets 6A and 6B (support members) are attached near the center of an upper frame 4a and a lower frame 4b of the bulkhead 4 so as to extend from the top surface and over the front surface of the radiator 5. The pipe brackets 6A and 6B are disposed at a distance in the width direction of the vehicle and the radar device Sr is supported by the pipe brackets 6A and 6B. A cross bracket 7 (support member) is coupled to approximately center of each pipe bracket 6A and 6B, and rigidly links the brackets 6A and 6B.

Figure 3:
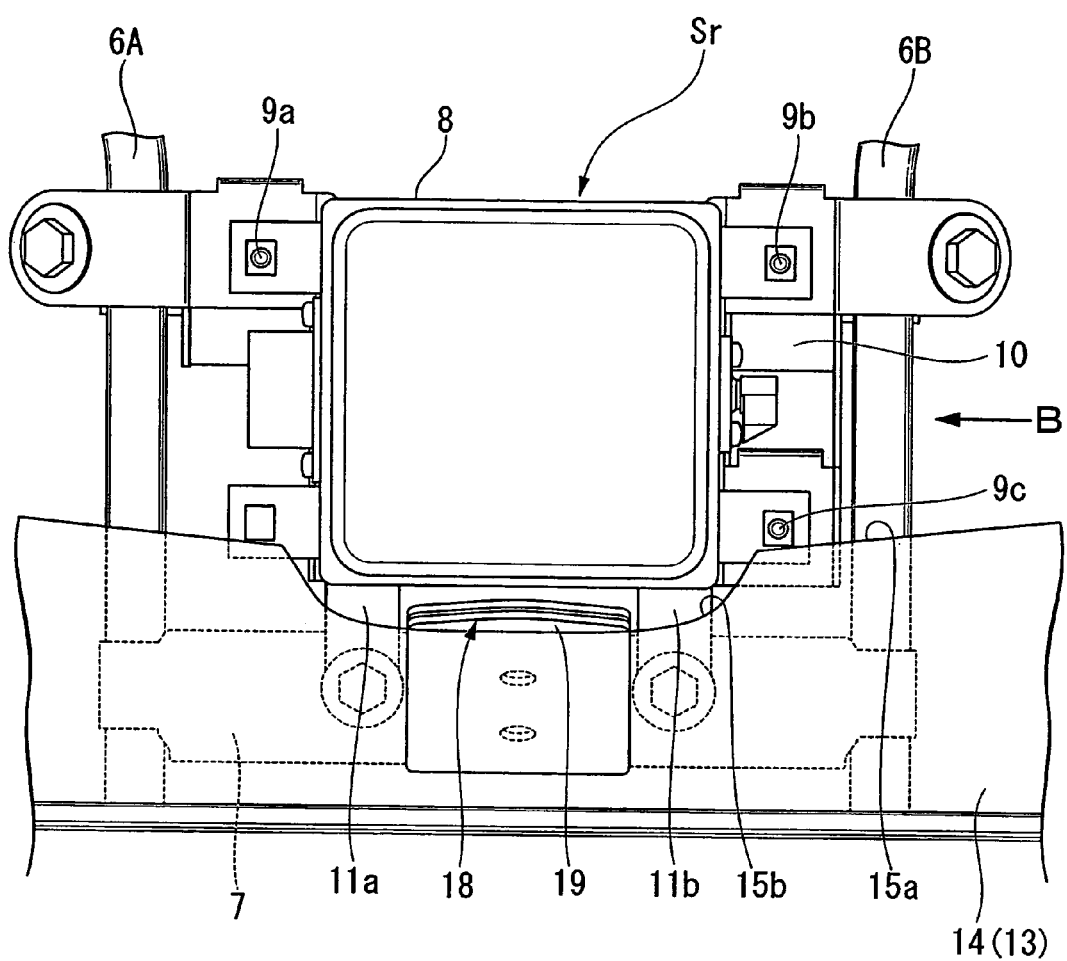
FIG. 3 is an enlarged front view of the portion A shown in FIG. 1.
Figure 4:
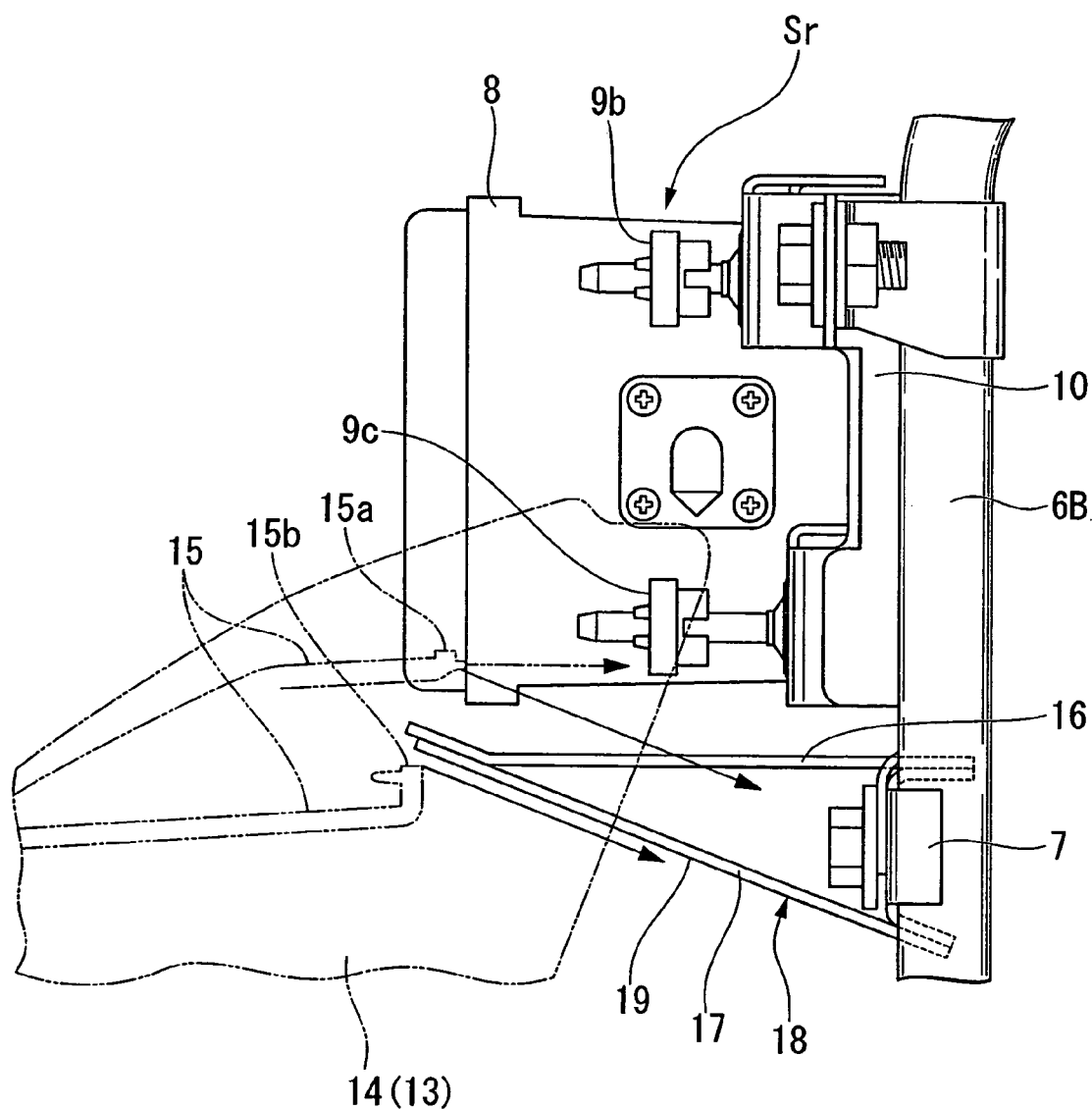
FIG. 4 is a side view from the arrow B shown in FIG. 3.

As shown in FIGS. 2 to 4, the millimeter-wave radar device Sr has a constitution such that a base plate 10 is mounted on a back side of a rectangular solid casing 8 via three axis adjustment mechanisms 9a, 9b, and 9c. The top edge of the base plate 10 is fixed with a clamp to the pipe brackets 6A and 6B. Lips 11a and 11b, which are provided on the lower edge of the base plate 10 in an extending manner, are coupled to the cross brackets 7.

In front of the radar device Sr, the front grill 2 and a front bumper 13 are disposed as exterior members of the vehicle body as shown in FIG. 1. Both ends of the front bumper 13 are fixed to the side frames via stays (not illustrated).

In a bumper face 14 of the front bumper 13, an upper wall 15 extends rearward of the vehicle body around a portion where the bumper face 14 faces the front grill 2. As shown in FIGS. 3 and 4, the upper wall 15 extends in such a way to overlap with the radar device Sr in the longitudinal direction, and a recess is formed at approximately center in the width direction of the upper wall 15 in order to avoid interference with the radar device Sr. Hereinafter, the recess is described as a recess portion 15b to distinguish it from another general portion 15a of the upper wall 15.

A guide member 18 shown in FIGS. 2 to 4 is welded to the cross bracket 7 below the radar device Sr. The guide member 18 controls the front bumper 13 such that the front bumper 13 will move beneath the radar device Sr during a collision.

In the present embodiment, the guide member 18 includes a first plate member 16 and a second plate member 17. The first plate member 16 extends approximately forward with respect to the vehicle body from the upper wall of the cross bracket 7. The front end of the second plate member 17 is coupled to the first plate member 16 and the rear end of the second member 17 extends rearward at an angle and is coupled to the lower wall of the cross bracket 7. The lower front face of the second plate member 17 is flat and is constituted as a guide surface 19. The guide surface 19 abuts the front bumper 13 and controls the moving direction of the front bumper 13 during a collision. The front end of the guide surface 19 is disposed to face the rear end of the recess portion 15b of the bumper face 14 and the rear end of the recess portion 15b is adapted to abut the reclining guide surface 19.

Figure 5:
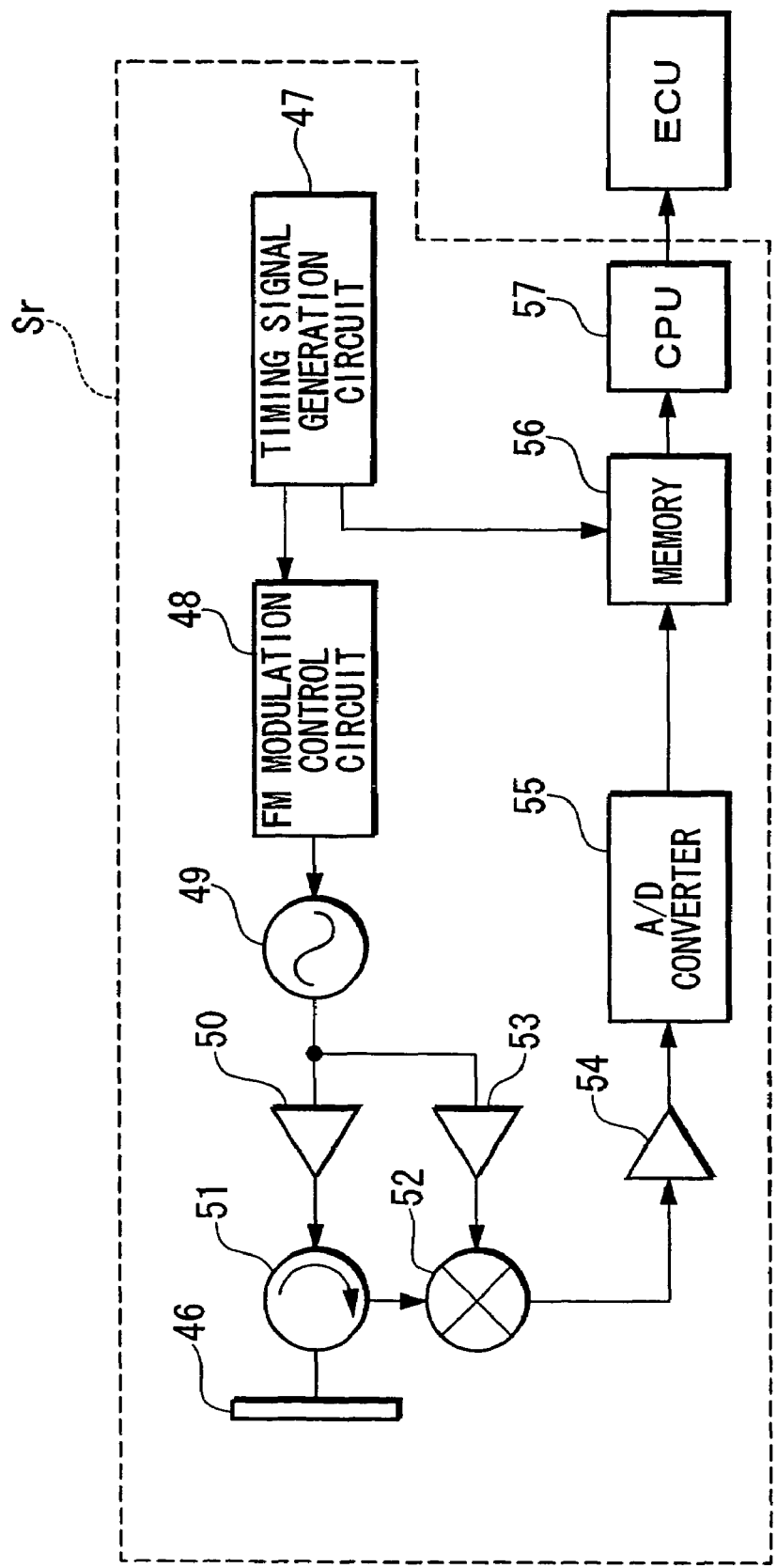
FIG. 5 is a block diagram of a millimeter-wave radar device which is the object detector in the present embodiment.

The millimeter-wave radar device Sr used as the object detector shall be described. As shown in FIG. 5, the millimeter-wave radar device Sr includes a planar antenna 46 having a planar transmission antenna which transmits millimeter waves and a planar receive antenna which receives millimeter waves reflected by an object ahead of the vehicle.

Figure 6A:
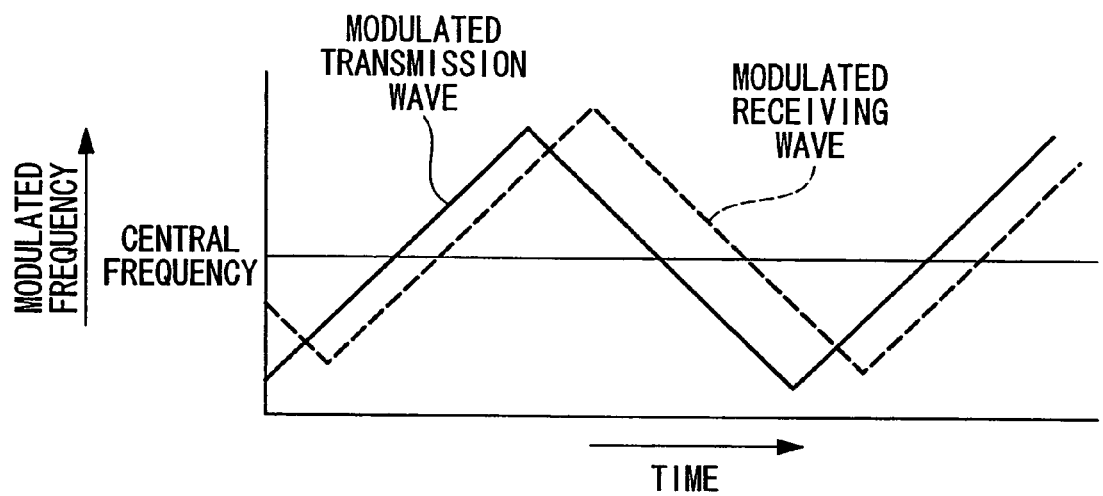
FIGS. 6A and 6B are graphs showing sent and received waveforms and their peak frequencies of the millimeter-wave radar device when an object is approaching the antenna of the radar device.
Figure 6B:
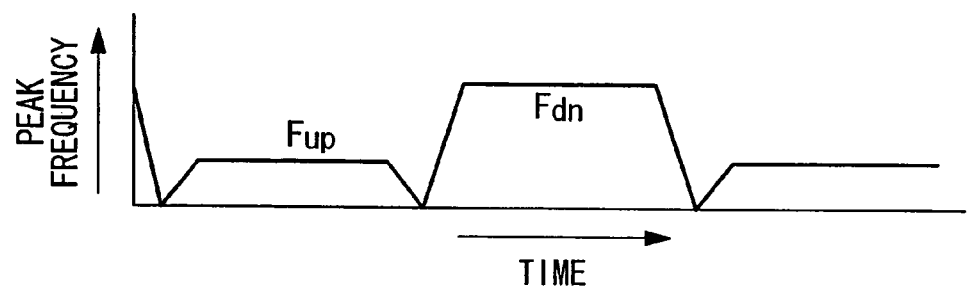

In the radar device Sr using a frequency modulated continuous wave (FM-CW), an operation of a transmitter 49 performs modulation control by a FM modulation control circuit 48 based on a timing signal input from a timing signal generation circuit 47. As shown in FIG. 6A by the solid line, transmitter pulses are frequency modulated as triangular waves are transmitted from the planar antenna 46 via an amplifier 50 and a circulator 51 in different horizontal directions (e.g., 9 channels) within a predetermined detection area ahead of the vehicle. A reflected wave, which is an FM-CW, is reflected by an object such as another vehicle ahead of the vehicle is received by the planar antenna 46 as a receiving wave.

When the object is approaching the vehicle, the receiving wave appears later than the transmitter pulse, with lower frequency than the transmitter pulse in an increasing edge in which the frequency of the transmitter pulse linearly increases and with higher frequency than the transmitter pulse in a decreasing edge in which the frequency of the transmitter pulse linearly decreases, as shown in FIG. 6A by a dashed line.

The receiving wave received by the antenna 46 is input to a mixer 52 via the circulator 51. Besides the receiving wave, the transmitter pulse which is distributed from the transmitter pulse from the transmitter 49 is input to the mixer 52 via an amplifier 53. By mixing the transmitter pulse with the receiving wave in the mixer 52, a beat signal is generated. The beat signal has a peak frequency Fup in the increasing portion and a peak frequency Fdn in the decreasing portion.

The beat signal obtained in the mixer 52 is amplified by an amplifier 54 to a desired level, and A/D conversion is performed by an A/D converter 55 at each sampling time. The digital amplified data is stored in a memory 56 in a chronological manner. The timing signal is input to the memory 56 from the timing signal generation circuit 47, and the memory 56 stores the data of the increasing portion or the decreasing portion in accordance with the timing signal.

A central processing unit (CPU) 57 calculates the distance and the relative velocity between the object and the vehicle by known methods based on the data and peak frequencies Fup and Fdn thereof which are stored in the memory 56, and communicates with an electrical control unit (ECU) such as an adaptive cruise control (ACC) system and a Stop & Go system.

Operations and functions of each member during a light collision of the vehicle shall be described below.

Before a collision, the recess portion 15b in the upper face of the bumper face 14 crosses below the casing 8 of the radar device Sr and both ends of the recess portion 15b overlap the base plate 10 and a part of the axis adjustment mechanism 9c in the front view.

When the bumper face 14 moves toward the radar device Sr by a force due to a collision as shown by a chain arrow in FIG. 4, the rear end of the recess portion abuts the guide face 19 of the guide member 18. When the front bumper 13 further moves, the bumper face 14 receives a camming action by the guide face 19 and is controlled so as to move along the guide face 19 (refer to the solid-line arrow in FIG. 4).

When the bumper face 14 moves rearward at the time of a collision, both ends of the recess portion 15b interfere with the radar device Sr. However, this interference can be avoided by the regulation of the guide member 18 in the present attachment structure. Since the bumper face 14 does not interfere with the radar device Sr in a light collision with the present attachment structure, the misalignment of the radar device Sr can be securely prevented. As a result, in the case of a light collision, the radar device Sr can be used after the collision.

Since in the present embodiment, the bumper face 14 is smoothly guided by the flat guide face 19 which descends below the radar device Sr so as to move apart from the radar device Sr during a collision, the interference of the bumper face 14 and the radar device Sr can be more securely prevented.

Though the guide member 18 does not have to include the plate members 16 and 17, when constituting the first plate member 16 which extends straight ahead and the second plate member 17 having the guide face 19 as a truss structure and coupling the cross bracket 7 which is the support member of the radar device Sr, the pressure acted on the guide face 19 from the bumper face 14 can be securely tolerated without weight increase of the vehicle. Since the cross bracket 7 and the pipe brackets 6A and 6B are formed to have a high rigidity so that the radar device Sr is supported by the vehicle body, these members can fix the guide member 18 to the vehicle body in conjunction with the truss structure of the plate members 16 and 17, and the pressure from the bumper face 14 can be securely tolerated.

The present invention is not limited to the aforementioned embodiments and various modifications are possible. For example, though a millimeter-wave radar is used as the object detector in the aforementioned embodiments, a laser radar device or a stereo camera may be used as the object detector.

In addition, though the guide member is disposed below the object detector (the radar device Sr) in the embodiments, it may be disposed above the object detector or on the side thereof. Furthermore, the exterior member which is moving-direction controlled during a collision is not limited to the bumper. It may be a grill which has the potential to interfere with the object detector during a collision.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An attachment structure for attaching an object detector to a vehicle body, said attachment structure comprising:
   a support portion provided on a lower side of the object detector;
   a fixing portion which fixes the object detector to the vehicle body at the support portion;
   an exterior member having an upper wall, and provided in front of the support portion of the object detector; and
   a guide member which is fixed below the object detector, said guide member having a guide surface for guiding a movement of the exterior member by abutting the upper wall of the exterior member when the exterior member moves toward the object detector due to a collision of the vehicle body,
   wherein a front end of the guide surface is disposed to face towards a rear end of the upper wall of the exterior member.

2. The attachment structure according to claim 1, wherein the guide member comprises:
   a first member which extends forwardly on the vehicle body, and
   a second member integrally connected with a front end of the first member at a junction portion, the second member extending rearwardly from the junction portion at an angle, and constituting the guide surface.

3. The attachment structure according to claim 2, further comprising a support member provided in the vehicle body; wherein the first member and the second member are fixed to the support member.

4. An attachment structure for attaching an object detector to a vehicle body, said attachment structure comprising:
   a support portion provided on the object detector;
   a fixing portion which fixes the object detector to the vehicle body at the support portion;
   an exterior member having an upper wall, and provided in front of the support portion of the object detector; and
   a guide member which has a guide surface guiding a movement of the exterior member by abutting the upper wall of the exterior member when the exterior member moves toward the object detector due to a collision of the vehicle body,
   wherein the guide member comprises:
      a first member which extends forwardly on the vehicle body, and
      a second member integrally connected with a front end of the first member at a junction portion, the second member extending rearwardly from the junction portion at angle, and constituting the guide surface.

5. An attachment structure for attaching an object detector to a vehicle body, said attachment structure comprising:
   a support portion provided on the object detector;
   a fixing portion which fixes the object detector to the vehicle body at the support portion;
   an exterior member having an upper wall, and provided in front of the support portion of the object detector;
   a guide member which has a guide surface guiding a movement of the exterior member by abutting the upper wall of the exterior member when the exterior member moves toward the object detector due to a collision of the vehicle body; and
   a support member provided in the vehicle body,
   wherein the guide member comprises:
      a first member which extends forwardly on the vehicle body, and
      a second member integrally connected with a front end of the first member at a junction portion, the second member extending rearwardly from the junction portion at angle, and constituting the guide surface; and
      wherein the first member and the second member are fixed to the support member.

6. The attachment structure according to claim 1, wherein the exterior member is a bumper provided on the vehicle body, the bumper comprising an upper surface having a substantially central recess formed therein, and wherein the guide member comprises an outer end which is disposed above a portion of the bumper adjacent to the recess.

7. In a vehicle having a vehicle body comprising a bumper, the improvement comprising an attachment structure for attaching an object detector to the vehicle body and for guiding movement of the bumper in the event of a collision, said attachment structure comprising:
   a support portion provided on the object detector;
   an intermediate bracket which operatively attaches the object detector to the vehicle body at the support portion; and
   a guide member operatively attached to the intermediate bracket,
   wherein the bumper is provided in front of the object detector,
   wherein a front end of the guide member is disposed above and adjacent to a substantially central portion of the bumper, and
   wherein the guide member is configured to control a moving direction of the bumper when the bumper moves toward the object detector due to a collision of the vehicle body, while permitting the object detector to remain in place in relation to the vehicle body.

8. The attachment structure according to claim 7, wherein the bumper comprises an upper surface having a substantially central recess formed therein, and wherein the front end portion of the guide member is disposed above a portion of the bumper adjacent the recess.

9. The attachment structure according to claim 8, wherein the guide member has a guide surface for abutting the bumper and for guiding the movement of the bumper.

10. The attachment structure according to claim 8, further comprising a support member provided on the vehicle body; wherein the support member is operatively attached to the support portion.

* * * * *